United States Patent [19]
Pearce et al.

[11] Patent Number: 4,759,673
[45] Date of Patent: Jul. 26, 1988

[54] APPARATUS FOR ENABLING TRANSIT OF ARTICLES BETWEEN ADJACENT SURFACES

[75] Inventors: Ronald A. Pearce, Lakewood; Milton W. Kapke, Golden, both of Colo.

[73] Assignee: Goldco Industries, Inc., Loveland, Colo.

[21] Appl. No.: 57,036

[22] Filed: Jun. 1, 1987

[51] Int. Cl.⁴ .............................................. B65G 57/09
[52] U.S. Cl. ...................................... 414/42; 14/71.1; 198/425; 198/600; 414/59; 414/86
[58] Field of Search .................... 414/42, 59, 82, 86, 414/89; 14/71.1, 71.3, 71.7; 198/425, 600

[56] References Cited
U.S. PATENT DOCUMENTS

| | | | |
|---|---|---|---|
| 2,739,718 | 3/1956 | Birchall | 414/82 |
| 2,774,489 | 12/1956 | Guigas | 414/59 X |
| 3,200,969 | 8/1965 | Madden | 414/59 |
| 3,219,203 | 11/1965 | Jeremiah | 414/59 X |
| 3,249,242 | 5/1966 | Zachow | 414/32 |
| 3,865,258 | 2/1975 | Müller | 414/42 X |
| 4,510,638 | 4/1985 | Alten | 14/71.1 X |

Primary Examiner—Leslie J. Paperner
Attorney, Agent, or Firm—Robert E. Harris

[57] ABSTRACT

An apparatus for transit of articles between a transfer surface and an adjacent separator sheet is disclosed with the apparatus having a selectively positionable and extendable bridge for providing a transitional surface between the transfer surface and the sheet and for overlapping a portion of the sheet adjacent to the transfer surface when in a first position, and for providing a clearance for placement and positioning of the sheet when in a second position.

15 Claims, 5 Drawing Sheets

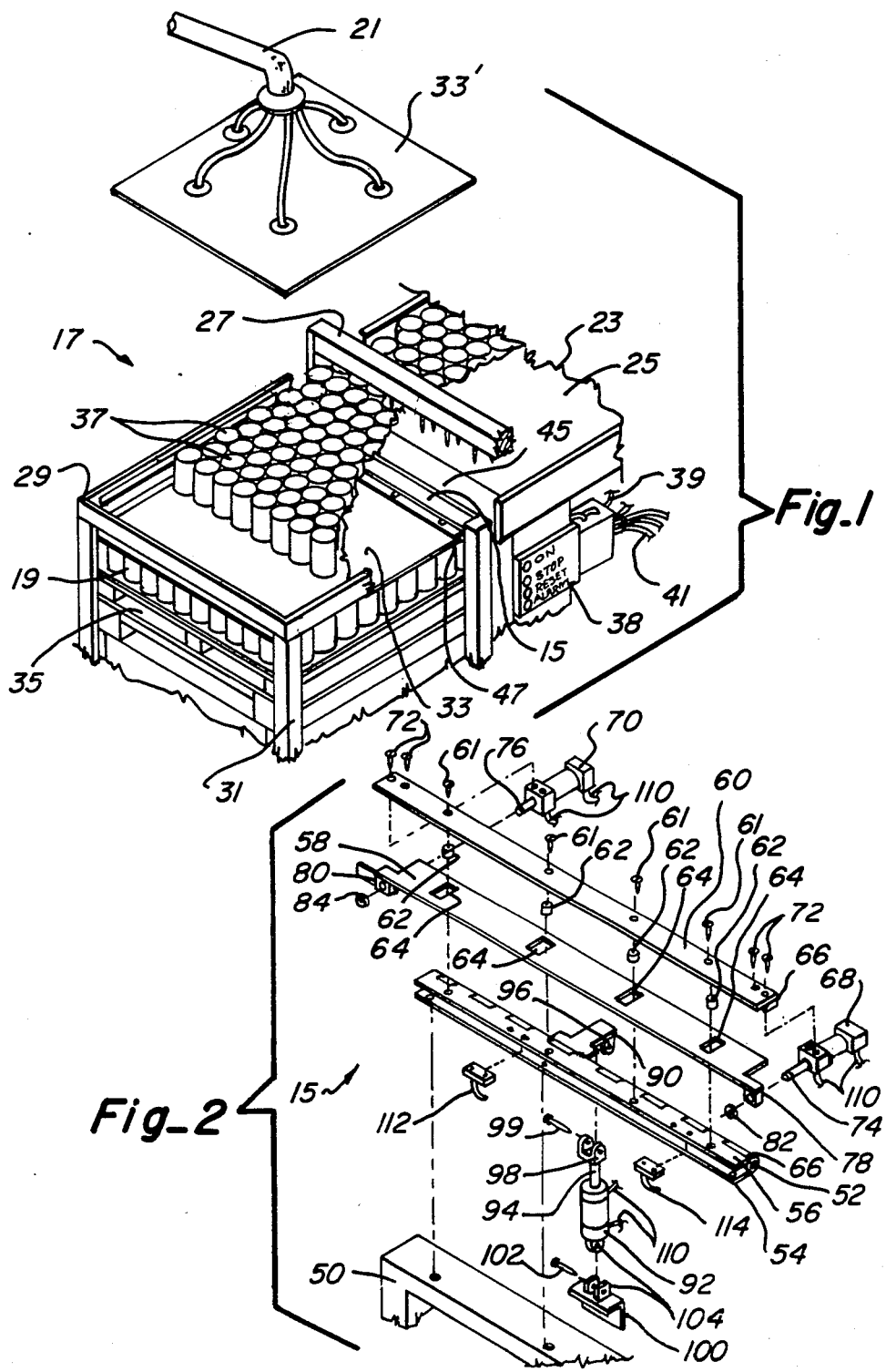

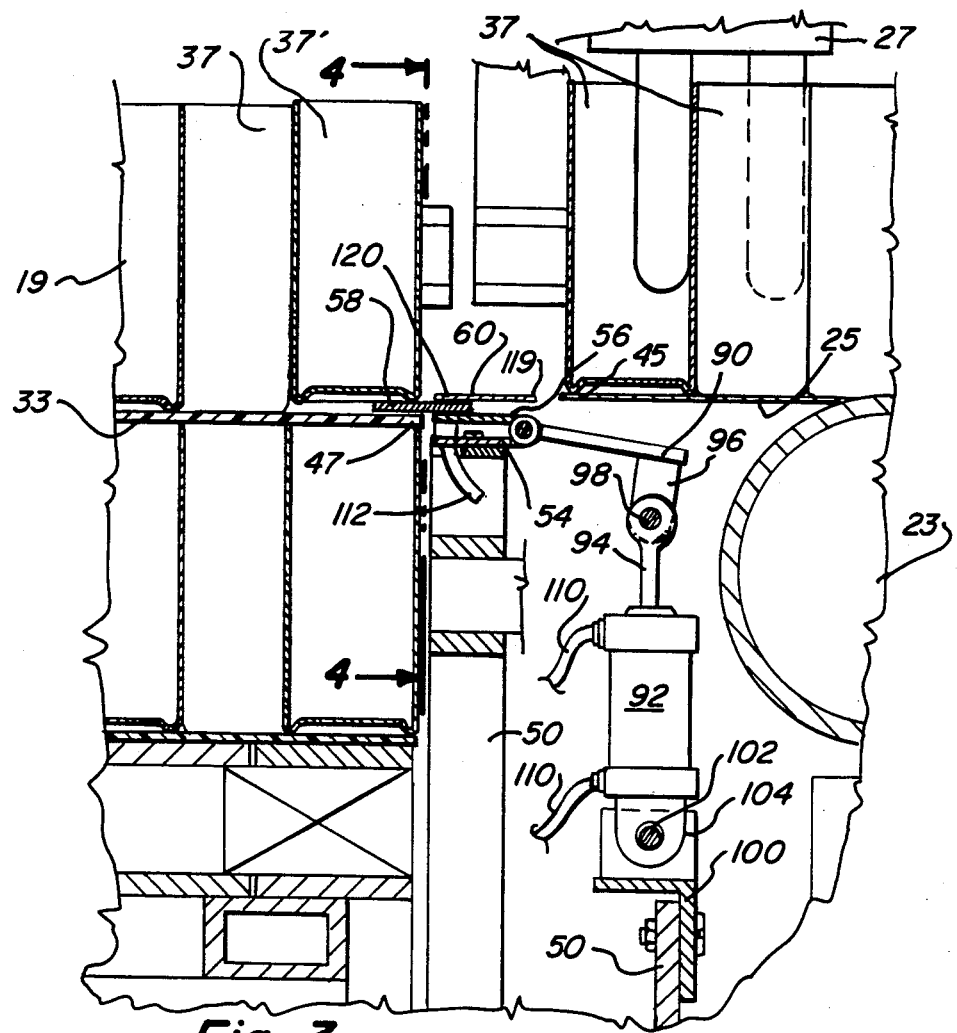
Fig_3
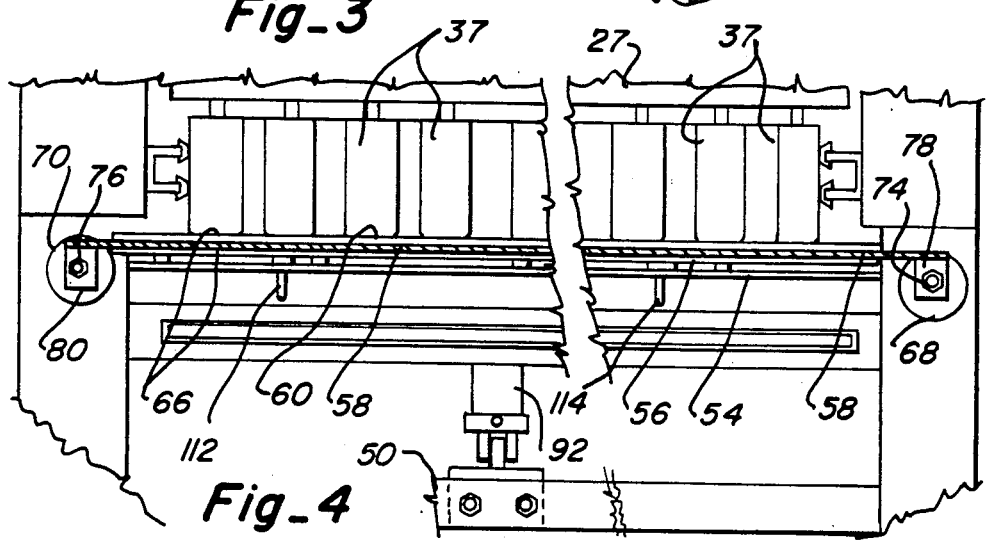
Fig_4

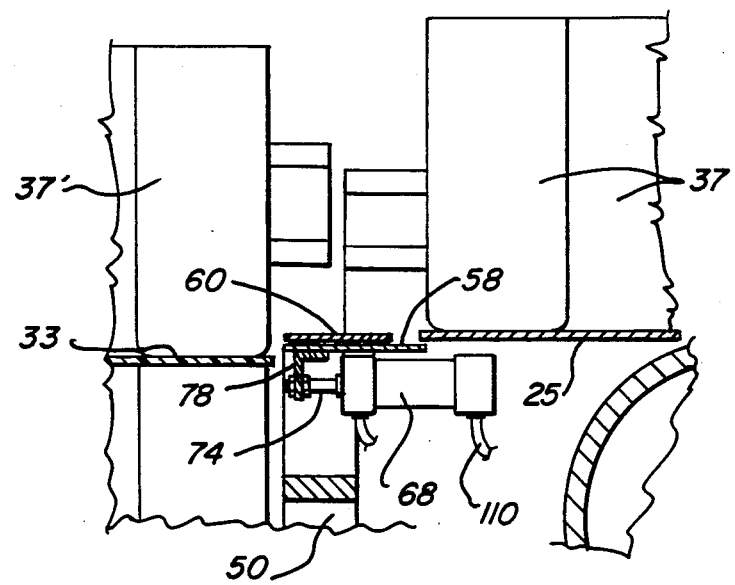
Fig_5
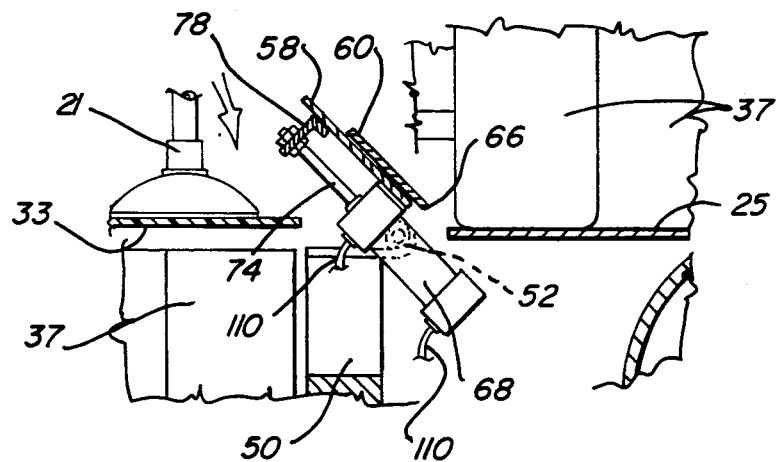
Fig_6

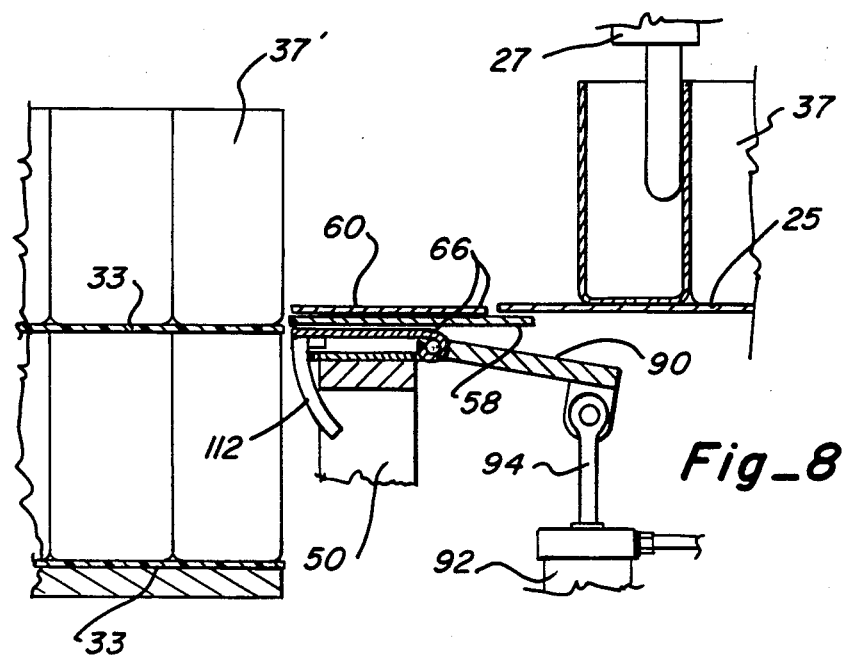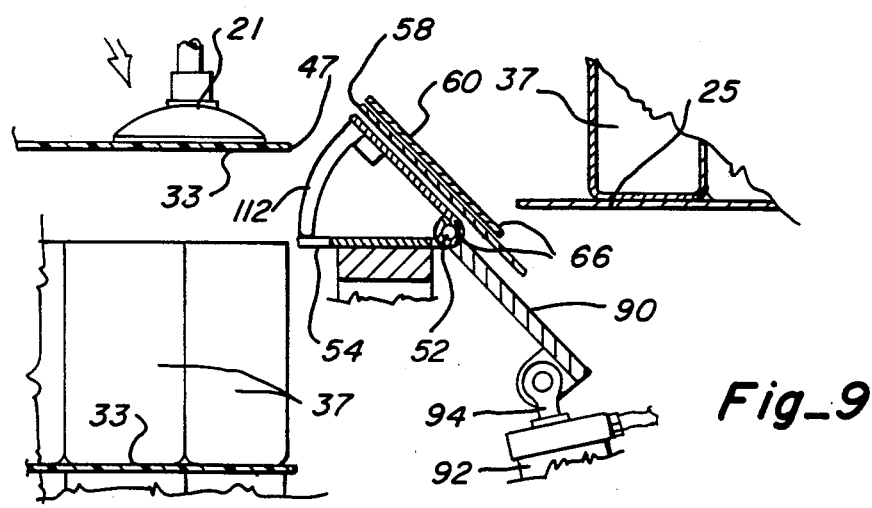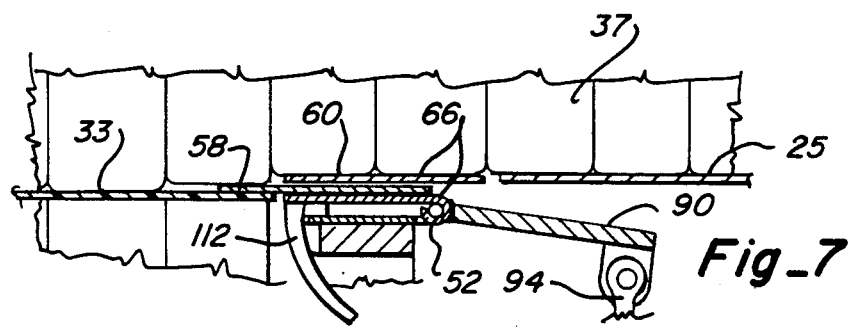

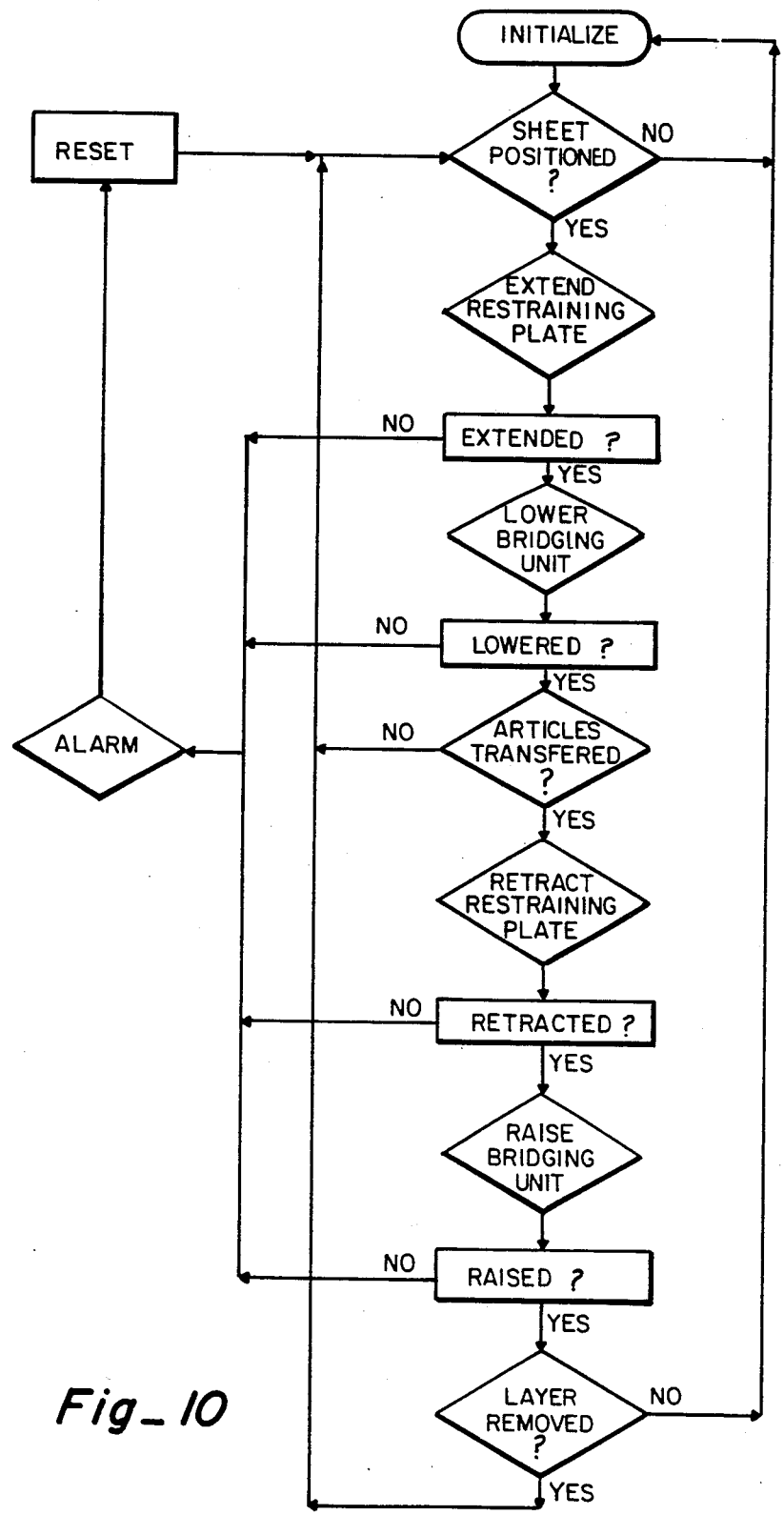
Fig_10

APPARATUS FOR ENABLING TRANSIT OF ARTICLES BETWEEN ADJACENT SURFACES

FIELD OF THE INVENTION

This invention relates to an apparatus for transit of articles between surfaces, and, more particularly, relates to an apparatus for selectively unifying an article transfer surface and an adjacent separator sheet for transit of articles therebetween.

BACKGROUND OF THE INVENTION

Article transfer and stacking systems for moving various articles to a separator sheet separating tiers, or layers, of stacked, palletized articled for formation of a layer of articles thereon have been heretofore suggested and/or utilized (see, for example, U.S. Pat. Nos. 3,897,877 and 4,154,347, and U.S. Patent Application Ser. No. 6/735,756 filed May 20, 1985, all assigned to the assignee of the instant application, and incorporated by reference herein).

It is known, however, that at least some such sheets, which are usually constructed of relatively light materials such as paper, paper board, plastic and the like, require restraint in order to assure a smooth flow of articles from an article gathering and transfer surface, such as a conveyor for example, to such a sheet. Heretofore, where restraint was found to be necessary or desirable, such restraint has been known to be accomplished by manually holding down the edge of the sheet adjacent to the transfer surface to assure such articles, for example cans and the like, are not overturned in transit to the sheet.

It is also known that a transition surface between the sheet and the gathering and transfer surface may be utilized to further assure the undisturbed flow of articles therebetween.

SUMMARY OF THE INVENTION

This invention provides an apparatus for selectively unifying an article transfer surface and an adjacent sheet for transit of articles therebetween which includes a selectively positionable and extendable bridge for providing a transitional surface between the transfer surface and the sheet and overlapping a portion of the sheet adjacent to the transfer surface, thus restraining movement of the sheet and/or sheet configuration, which may impede the smooth flow of articles to the sheet when in one selected position, and for providing clearance for placement and positioning of the sheet when in another selected position.

It is therefore an object of this invention to provide an apparatus for selectively unifying adjacent surfaces for transit of articles therebetween.

It is another object of this invention to provide an apparatus for transit of articles between a transfer surface, such as a conveyor and/or an extension surface thereof, and a separator sheet.

It is still another object of this invention to provide an apparatus for transit of articles between a surface and a sheet which is selectively positionable for providing a transitional surface between the surface and the sheet in a first position and a clearance for placement and positioning of the sheet in a second position.

It is yet another object of this invention to provide an apparatus for transit of articles between surfaces in a system for transfer, collection and stacking in tiers, or layers, of such articles.

It is still another object of this invention to provide an apparatus for transit of articles between a surface and a sheet which includes a pivotable bridge for providing a selectively positionable transition surface between the surface and the sheet and having a member extendable from the pivotable bridge for overlapping a portion of the sheet adjacent to the surface for thus restraining movement of the sheet.

It is still another object of this invention to provide an apparatus for transit of articles between a surface and a sheet which includes a selectively positionable and extendable bridge for providing a transitional surface between the surface and the sheet when in a first selected position and for providing clearance for placement and positioning of the sheet when in a second selected position and which includes a guard member to assure proper positioning of the edge of the sheet adjacent the surface.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the apparatus of this invention for transit of articles between adjacent surfaces and is shown in connection with a transfer and collection apparatus, a sheet transfer apparatus, and an apparatus for positioning and orienting articles on a separator sheet;

FIG. 2 is an exploded view of the apparatus of this invention;

FIG. 3 is a side sectional view of the apparatus of this invention shown in connection with a transfer surface and a sheet and particularly illustrating the bridging portion thereof;

FIG. 4 is a front sectional view taken through section lines 4—4 of FIG. 3;

FIG. 5 is a partial side view of the apparatus of this invention shown in connection with a transfer surface and a sheet and particularly illustrating the extendable member thereof;

FIG. 6 is a side sectional view of the apparatus of this invention as shown in FIG. 5 and particularly illustrating one of the selected positions of the apparatus;

FIG. 7 is a side sectional view of the apparatus of this invention as shown in FIG. 3 illustrating a second selected position of the apparatus;

FIG. 8 is a side sectional view as shown in FIG. 3 particularly illustrating a third selected position of the apparatus;

FIG. 9 is a side sectional view as shown in FIG. 3 particularly illustrating a fourth selected position of the apparatus; and FIG. 10 is a flow chart illustrating one mode of operational control of the apparatus of this invention.

DESCRIPTION OF THE INVENTION

As shown in FIG. 1, apparatus 15 for selectively unifying adjacent surfaces thereby providing a predetermined path for transit of articles therebetween may be usefully employed in conjunction with a system 17 for gathering, transferring and stacking of articles to be palletized in vertical tiers, or layers, 19. As shown, system 17 preferably includes a sheet transfer device 21 for inserting sheets between such layer of articles, an article transferring apparatus 23 for conveying articles to be palletized toward the palletizing area (for example, a conveyor), and having a transfer surface 25 (the forward portion of which is a stationary collection surface), an article gathering unit 27 for collecting articles and controlling movement of the collected articles toward the palletizing area, an article positioning apparatus 29 to position the articles in layers at the palletizing area, and an elevator 31 to move each layer of palletized articles to enable receipt of the next layer.

As shown in FIG. 1, when apparatus 15 is positioned for transit of articles between transfer surface 25 and sheet 33, article gathering unit 27 is retracted to allow passage thereby of articles by transfer apparatus 23 for positioning on sheet 33 and squaring of the articles by positioning apparatus 29 to form such layers 19 on pallet 35. Separator sheet 33' is positioned for application to the newly formed tier, or layer, of articles (herein depicted as cans 37), upon completion of the layer and lowering of the layer in elevator 31, by sheet transfer apparatus 21. (Examples of the various units of the system herein described may be found, for example, in U.S. Pat. Nos. 3,897,877 and 4,154,347, and in U.S. Patent Application Ser. No. 6/735,756, heretofore referenced.)

System 17 also normally includes control unit 38 for combined control of the system, including apparatus 15, and valving unit 39, which may be any conventional valving apparatus for control of the various cylinders as hereinafter more fully described. Valving unit 39 may, for example, be connected to an in-house supply through supply line 41. As brought out hereinafter, control unit 38 and valving unit 39 can be modified to provide control of the apparatus 15 of this invention.

Apparatus 15 is positioned adjacent the trailing edge 45 of transfer surface 25 (at the collection surface) and overlaps leading edge 47 (in a flow wise direction) of sheet 33 for providing a transitional surface between transfer surface 25 and sheet 33 and for restraining movement of the leading edge of the sheet 33 to assure a smooth flow of articles between the surface and the sheet.

Turning now to FIG. 2, an exploded view of the apparatus for transit of articles 15 is shown. The apparatus is mounted on base 50 using conventional means, for example screws, bolts, welding or the like, at hinge unit 52 including mounting plate 54 and pivotable plate member 56. Extendable plate member 58 is mounted between pivotable plate member 56 and top plate member 60, top plate member 60 being mountable on plate member 56 by conventional means such as bolts 61 or the like, and with extendable plate member 58 being maintained therebetween on slides 62 mounted over bolts 61 and through guide slots 64 in plate member 58 for allowing slidable motion of extendable plate member 58 within pivotable housing 66 formed by top plate 60 and pivotable plate 56. Cylinders 68 and 70 are mounted to top plate 60 by screws 72 and include pistons 74 and 76 which are connected to blocks 78 and 80 using retainers 82 and 84 for thereby imparting the slidable motion to extendable plate member 58 in pivotable housing 66.

Pivotable housing 66 is attached to pivot block 90 by welding or the like. Cylinder 92 includes piston 94 and piston 94 is rotatably mounted to pivot block 90 at hinge mount 96 by mating hinge mount 98 using pin 99. Cylinder 92 is rotatably mounted to base 50 at cylinder mount 100 which is attached by conventional means, such as bolting or welding, to the base. Cylinder 92 is maintained on cylinder mount 100 by pin 102 through matable hinge segments 104. Cylinders 68, 70 and 92 are connected to valving 39 (as shown in FIG. 1) by positive pressure supply lines 110 for selectively extending and retracting pistons 74, 76 and 94 to thereby properly position the apparatus.

Guard bar assemblies 112 and 114 are mounted to pivotable plate member 56 by conventional means (for example, screws, bolts, welding, and the like) and may either be configured to pass through voids in plate 54 and base 50, or to pass in front of the leading edges thereof. Guard bars 112 and 114 assure that a sheet is properly positioned at its leading edge 47 thus preventing passage of the sheet into the space between plate 54 and pivotable plate member 56 upon placement on a layer by sheet transfer device 21.

Turning now to FIGS. 3 and 4, cylinder 92 is shown with piston 94 extended thereby bringing plate 60 into alignment with transfer surface 25 and with one edge 119 adjacent to trailing edge 45 thereof, so that the opposite edge 120 is adjacent leading edge 47 of sheet 33 thereby providing a transition surface or bridge between the transfer surface and the sheet. Extendable plate member 58 has been extended (effectively extending the transition surface to provide a predetermined path between the transfer surface and sheet) so that a portion of extendable plate member 58 overlaps leading edge 47 of sheet 33 thereby restraining movement of and/or curling in leading edge 47 (due at least in part to the light weight materials used to construct the sheet and/or curling imparted to the sheet edge in the process of manufacture or storage). The last row of articles 37' of layer 19 rests on extendable plate member 58.

As shown in FIG. 4, cylinders 68 and 70 extend and retract extendable plate member 58 by movement of pistons 74 and 76 and thus blocks 78 and 80 which are attached to plate 58 in such a manner as to be free of obstruction from housing 66. As shown in FIG. 5, when piston 74 is retracted by cylinder 68 thus retracting extendable plate 58 the last row of articles 37' comes to rest on sheet 33.

Referring now to FIGS. 6 through 9, a full cycle of operation of the device as controlled by controller 38 and valving unit 39 is illustrated. A full cycle of operation is set forth in the flow diagram illustrated in FIG. 10, and it is meant to be understood that each cycle of operation could be controlled by a microprocessor, and that various known sensors can be positioned and utilized, as necessary or desirable to provide information to the controller to enable the steps of the operation to be automatically and sequentially effected.

As illustrated in FIG. 6, when sheet 33 has been lowered by sheet transfer device 21, positioning of sheet 33 is sensed and cylinders 68 and 70 are supplied with the appropriate fluid pressure (for example, air pressure from an in-house air supply through valving 39 of FIG. 1) through the appropriate supply line 110 to extend piston 74 and thus extendable plate member 58 from housing 66 while housing 66 is being maintained in its raised position on hinge 52.

As indicated in FIG. 7, housing 66 is then lowered on hinge 52 by extension of piston 94 thereby bringing top plate member 60 and extendable plate member 58 into position for transfer of articles between transfer surface 25 and sheet 33.

When transfer of sufficient articles 37 to form layer has been accomplished, extendable plate 58 is retracted thereby bringing final row of articles 37' into contact with sheet 33 as shown in FIG. 8 (and as also shown in FIG. 5). As shown in FIG. 9, piston 94 is thereafter retracted by the appropriate air pressure supply to cylinder 92 thus raising housing 66 on hinge 52, providing a clearance for placement of the next sheet brought into position. As also shown in FIG. 9, guide bar assembly 112 is thus positioned so that, when sheet 33 is dropped into place by sheet transfer means 21, the sheet will be properly positioned along its leading edge 47 over articles 37 and not allowed to pass between housing 66 and mounting plate 54.

When the most recently transferred and positioned layer of articles 37 has been lowered (in elevator 31 shown in FIG. 1) and a new sheet 33 brought into place on the most recently formed layer, the process may be renewed.

Position sensors and/or other conventional method for sensing positioning of the various movable elements of the apparatus, articles and related system may be employed with a control arrangement for serial orchestration of the above described operations. FIG. 10 illustrates operation of a controller for controlling the operational flow as heretofore described.

As can be appreciated from the foregoing, this invention provides an apparatus for selectively unifying adjacent surfaces, such as an article transfer surface and a separator sheet, for smooth transit of articles therebetween.

What is claimed is:

1. An apparatus for enabling transit of articles in a predetermined path between a first surface and an adjacent separator sheet, said sheet having an unconfined edge adjacent to said first surface, said apparatus comprising:
    bridging means selectively positionable between said first surface and said sheet and adjacent said unconfined edge of said sheet in a first position for providing a transitional surface between said first surface and said sheet;
    means extendable from said bridging means for extending said predetermined path over said unconfined edge when said bridging means is in said first position, said means extendable from said bridging means being retractable from beneath articles transferred to said sheet without overturning said articles;
    positioning means for positioning said bridging means in said first position, for extending and retracting said means extendable from said bridging means, and for positioning said bridging means in a second position after retraction of said means extendable from said bridging means to thereby provide clearance for subsequent placement and positioning of a sheet; and
    guard means attached to said bridging means for assuring proper positioning of said unconfined edge of said sheet when said bridging means is in said second position.

2. The apparatus of claim 1 wherein said positioning means are pneumatic cylinders.

3. The apparatus of claim 1 further comprising control means for controlling said positioning means for establishment of said first and second positions of said bridging means and said extension and retraction of said means extendable from said bridging means.

4. The apparatus of claim 1 wherein said bridging means is pivotably connected to said positioning means for establishment of said first and second positions.

5. An apparatus for enabling transit of articles in a predetermined path between a surface having a trailing edge and a sheet having a leading edge comprising:
    a pivotable member having a first edge adjacent said trailing edge of said surface and a second edge opposite said first edge, said second edge being selectively positionable adjacent to said leading edge of said sheet in a first position and spaced from said leading edge of said sheet in a second position;
    guard means for assuring proper positioning of said leading edge of said sheet when said second edge of said pivotable member is in said second position; and
    a member extendable from said second edge of said pivotable member for extending said predetermined path over said leading edge of said sheet when said pivotable member is in said first position.

6. The apparatus of claim 5 wherein said member extendable from said second edge of said pivotable member includes means for retraction of said member.

7. The apparatus of claim 6 wherein said apparatus includes positioning means for positioning said second edge of said pivotable member in said first and second positions and for positioning said member extendable from said second edge of said pivotable member, and control means for selectively controlling said positioning means.

8. The apparatus of claim 5 wherein said pivotable member includes first and second plate members forming a housing for said member extendable from said second edge of said pivotable member.

9. The apparatus of claim 8 wherein said member extendable from said second edge of said pivotable member includes a plate member slidably mounted in said housing.

10. In an article transfer and stacking system, an apparatus for enabling transit of articles between an article transfer surface and a separator sheet for separating layers of stacked articles adjacent to said transfer surface, said apparatus comprising:
    bridging means selectively positionable between said transfer surface and said sheet for providing a transitional surface between said transfer surface and said separator sheet in a first position and a clearance for placement and positioning of said sheet on the last formed of said layers of said stacked articles in a second position;
    means extendable from said bridging means while in said second position and at least partially overlapping a portion of said sheet adjacent to said transfer surface when said bridging means is positioned in said first position for extending said transitional surface to said sheet for transit of said articles thereover, said means being retractable after transit of a layer of articles to said sheet;
    guard means attached to said bridging means for assuring proper positioning of said portion of said sheet adjacent to said transfer surface when said bridging means is positioned in said second position; and positioning means for positioning said bridging means in said first and second positions and for extending and retracting said means extendable from said bridging means.

11. The apparatus of claim 10 wherein said positioning means includes a first positioning means for positioning said bridging means and a second positioning means for extending and retracting said means extendable from said bridging means.

12. The apparatus of claim 10 wherein said bridging means includes first and second plate members forming a housing for slidably maintaining said means extendable from said bridging means.

13. The apparatus of claim 12 further comprising a base for pivotable mounting of said housing thereon.

14. The apparatus of claim 10 wherein said apparatus further comprises control means connected to said positioning means for selection of said positions of said bridging means and of said extension and retraction of said means extendable from said bridging means.

15. The apparatus of claim 11 wherein said second positioning means are mounted on said bridging means.

* * * * *